P. R. STANHOPE.
DUMPING LEVER FOR ORE CARS AND THE LIKE.
APPLICATION FILED NOV. 25, 1911.
1,038,674.
Patented Sept. 17, 1912.
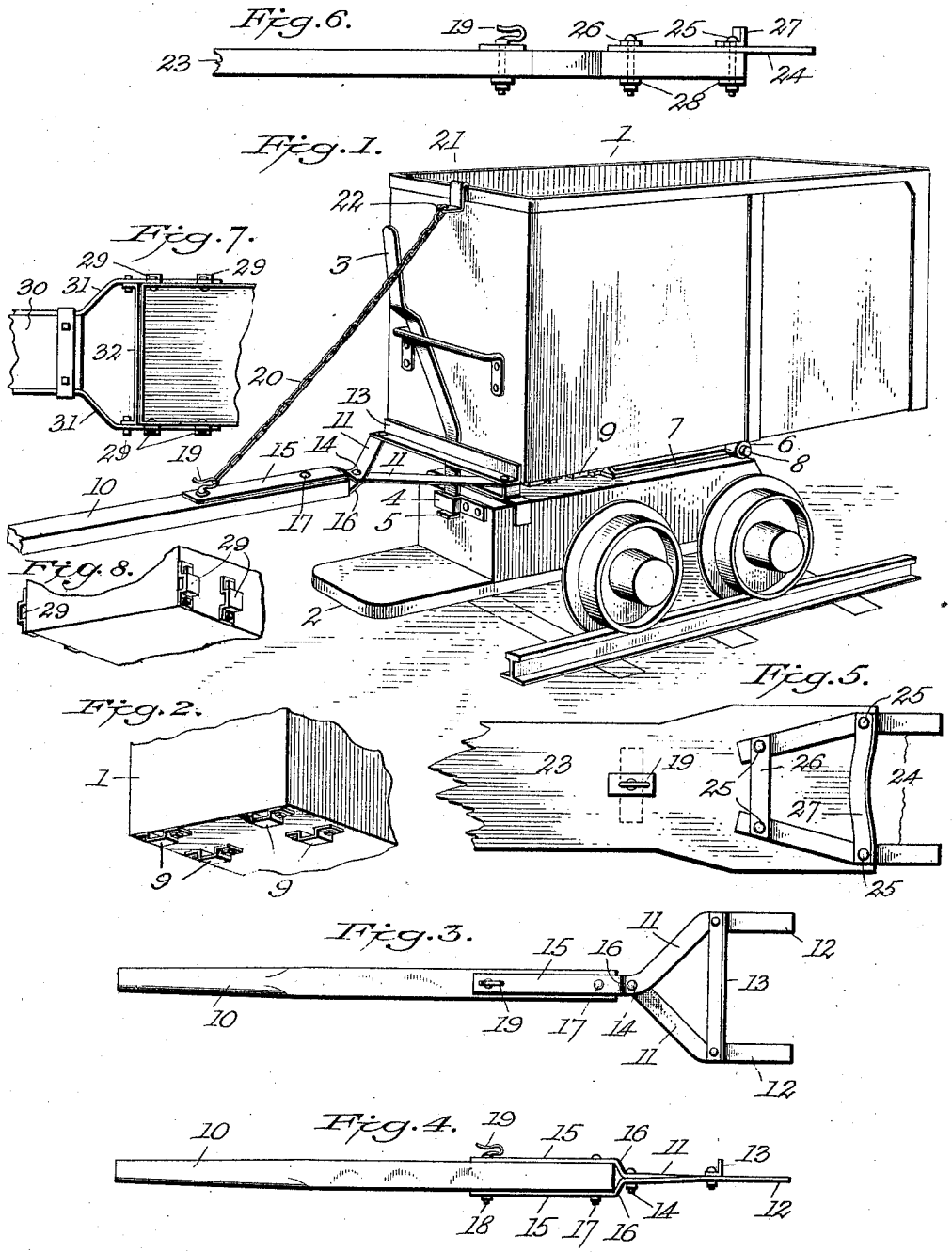
Witnesses:
G. Sargent Elliott
Adella M. Fowle
Inventor:
Philip R. Stanhope
By H. S. Bailey, Attorney

UNITED STATES PATENT OFFICE.

PHILIP R. STANHOPE, OF DENVER, COLORADO.

DUMPING-LEVER FOR ORE-CARS AND THE LIKE.

1,038,674.   Specification of Letters Patent.   Patented Sept. 17, 1912.

Application filed November 25, 1911. Serial No. 662,447.

*To all whom it may concern:*

Be it known that I, PHILIP R. STANHOPE, a citizen of the United States of America, residing in the city and county of Denver and State of Colorado, have invented new and useful Dumping-Levers for Ore-Cars and the Like, of which the following is a specification.

This invention relates to improvements in dumping levers for ore cars.

The object of the invention is to facilitate the dumping of such cars, by providing a lever having a forked end, which is adapted to be inserted in keepers bolted to the under side of the car, thereby to tilt the car and hold the same against a too sudden dumping movement, and to restore the car to its normal position after the same has been dumped; the lever and car being connected by a chain which relieves the stress upon the lever when the car is being dumped. These objects are accomplished by the device illustrated in the accompanying drawings, in which:

Figure 1, is a perspective view of a common form of ore car, showing the improved lever applied thereto. Fig. 2, is a perspective view of a portion of a car, showing the keepers secured to the bottom thereof for receiving the forked end of the dump lever. Fig. 3, is a plan view of the lever. Fig. 4, is a side view thereof. Figs. 5 and 6, are respectively, a plan and a side view of a form of lever in which an ordinary plank is used for a handle. And Fig. 7, is a plan view of a further modification in which the keepers which receive the forked end of the lever are secured upon the sides of the car body, instead of upon the bottom thereof, and the fork bars of the handle are arranged with their edges in a vertical direction, instead of in a horizontal direction and, Fig. 8 is a perspective view of a portion of a car, showing keepers arranged on opposite sides thereof to receive the form of lever shown in Fig. 7.

Similar letters of reference refer to similar parts throughout the several views.

Referring to the accompanying drawings, the numeral 1 indicates the body of an ore car of a style in common use; 2 indicates the truck upon which the body is mounted; 3, the lock and release lever which is pivotally secured to the car; and 4, a keeper on the end of the truck which receives the lower hooked end 5 of the lever 3, whereby the car is held in its normal or horizontal position when the said hooked end engages the keeper or is free to be dumped when the lever is moved to release its lower end from the said keeper. All of these parts or elements are in common use and form no part of the present invention. There are two styles of these cars in use, namely, the side dump cars and the rear dump cars. I have illustrated a rear dump car, but it will be understood that the improved lever is applicable to both styles of cars.

The manner of hinging the car body to the truck also forms no part of the present invention, and it is not necessary to describe this feature, but only to mention that the bottom of the car, at a suitable point, is provided with hinge straps 6, which are united to similar hinge straps 7, on the truck, by a transverse pin or rod 8.

To the bottom of the car are bolted pairs of U-shaped keepers 9, the keepers in each pair being in line, and the pairs being arranged in parallel order.

In connection with a rear dump car as shown in the drawings, these keepers are positioned on the underside of the front end of the car, but in the case of a side dump car, the keepers are positioned midway of the length of the car and opposite its dumping side.

The improved lever comprises an arm or handle 10, approximately eight feet in length, and preferably made of a tough wood, such as ash or hickory, upon opposite sides of the forward end of which are bolted metal bars 11. The forward ends 12 of these bars are spaced to correspond to the keepers 9, in which they are designed to be inserted, each end portion 12 being of sufficient length to extend through a pair of the keepers. An angle bar 13 is bolted to these end portions 12 a suitable distance from their extremities, and serves both as a brace to prevent the bars from spreading, and also as a stop which engages the end or side of the car, as the case may be, when the lever is inserted in the keepers. From the angle bar 13, the bars 11 converge, as shown, and overlap, and a bolt 14 passes through the overlapping portions. From this point they extend rearwardly, parallel with each other, and with the end portion 12, to form handle engaging members 15, and back of the bolt 14, the members 15 are bent transversely and in opposite directions, as shown at 16, to properly space them for the reception of the handle 10, to which they are bolted by bolts 17 and 18, the head of the latter bolt being in the form of a hook 19.

The hook 19 is adapted to receive one end of a chain 20, or other suitable flexible connection, the opposite end of which is provided with a suitable hook 21, which is adapted to engage the upper edge of the car when the lever is used. This hook is preferably constructed from a metal bar approximately two inches wide by one-half inch thick, and long enough to allow it to be given a deep U-shaped bend, one member of which is bent at right angles, as shown at 22, and provided with a hole to receive the end link of the chain.

In practice, the dumping of ore cars is frequently rendered very laborious, for various reasons, notably when the preponderance of the load weight is on the wrong side of the axis of the car, or when the hinge connection between the car body and truck is strained or twisted, but in any case the improved lever is designed to so facilitate the dumping of the car, as to relieve the attendants of any undue exertion in connection therewith.

It frequently happens that as the car dumps, one or more large stones become caught between the door and the bottom of the car,—the door being hinged at its upper end so as to swing outward, as will be understood,—and in this event, the car is often overbalanced and carried off of the track and onto the dump. But with the use of the dump lever, the car in its dumping movement is always under the control of the attendants, and such accidents are therefore prevented.

In Figs. 5 and 6 is illustrated a form of lever, in which an arm or handle 23 is formed of an ordinary plank of suitable dimensions. The fork comprises bars 24, which are suitably spaced and bolted to the end of the plank by bolts 25. The bars 24 are braced against spreading, by plates 26 and 27, which rest upon the said bars, and by plates 28, on the under side of the plank, the bolts 25 passing through these plates.

In Fig 7, a modification is illustrated, in which the car is provided with keepers 29, which are bolted upon its sides adjacent to the bottom of the car, instead of being bolted upon the bottom of the car. A lever 30 is used in this case, the fork of which is made up of bars 31, which are secured to the lever arm in any suitable manner, but so that the width of the bars is in a vertical direction, instead of being in a horizontal direction, as illustrated in Figs. 1 to 6 inclusive. The fork bars 31 are connected by a brace bar 32, which prevents spreading of the said bars. This modification provides a very strong lever, as the stress upon the fork is edgewise of the bars instead of sidewise.

It will be understood that the chain is used in connection with the modified forms of the lever, the same as in the form of lever shown in Fig. 1.

In dumping a car, the forked end of the lever is inserted in the keepers, and one end of the chain 20 is secured to the hook 19 on the lever, while the hook 21 on its opposite end is passed over the upper edge of the car body, as clearly shown in Fig. 1. The outer end of the lever is then raised to cause the car to tilt, and as it swings over to the dumping position, its movement is governed by downward pressure on the lever, which is transmitted to the car through the medium of the chain 20, thus relieving the forked end of the lever and the keepers of practically all of the stress.

The lever is quickly attached and detached, and is adaptable to cars in present use, by simply providing the cars with the keepers.

Having described my invention, what I claim as new and desire to secure by Letters Patent, is:

1. The combination with a dumping car having keepers thereon, of a dumping lever having a forked end adapted to enter the keepers, and a chain connecting the lever with the car body.

2. The combination with a dumping car having opposite pairs of keepers thereon, of a lever having a forked end adapted to enter said keepers, a chain connected at one end to the lever, and a hook on the opposite end of the chain for engaging the car body.

3. A lever for the purpose specified, comprising an arm which terminates in a forked end, and a chain secured at one end to the lever and having a hook on its opposite end.

4. A lever for the purpose specified, comprising an arm; bars secured to one end of the arm and bent to provide spaced, parallel extremities; a bar connecting said parallel portions a suitable distance from their outer ends; and a chain secured at one end to said lever and having a hook on its opposite end.

5. The combination with a dumping car having U-shaped keepers on its bottom, of a fork adapted to be inserted in the keepers; a bar connecting the members of the fork; a lever arm connected to the rear end of the fork; and a chain secured at one end to the lever arm and having a hook on its opposite end for engaging the edge of the car.

6. The combination with a dumping car having keepers on its under side, of a dumping lever for said car comprising an arm; metal bars secured to opposite sides of one end of the arm and bent to present spaced, parallel forward members; a bar connecting said parallel members; a hook on said arm; and a chain connected at one end to the hook, and having a hook on its opposite end, adapted to engage the upper edge of the car body.

In testimony whereof I affix my signature in presence of two witnesses.

PHILIP R. STANHOPE.

Witnesses:
G. SARGENT ELLIOTT,
ELIZABETH SMITH.

Copies of this patent may be obtained for five cents each, by addressing the "Commissioner of Patents, Washington, D. C."